(12) United States Patent
Min

(10) Patent No.: US 12,335,890 B2
(45) Date of Patent: Jun. 17, 2025

(54) PROPAGATION DELAY COMPENSATION SYSTEM IN RADIO BASE STATION

(71) Applicant: NTT DOCOMO, INC., Tokyo (JP)

(72) Inventor: Tianyang Min, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 90 days.

(21) Appl. No.: 18/247,166

(22) PCT Filed: Oct. 1, 2020

(86) PCT No.: PCT/JP2020/037465
§ 371 (c)(1),
(2) Date: Mar. 29, 2023

(87) PCT Pub. No.: WO2022/070391
PCT Pub. Date: Apr. 7, 2022

(65) Prior Publication Data
US 2023/0370991 A1 Nov. 16, 2023

(51) Int. Cl.
*H04W 56/00* (2009.01)
(52) U.S. Cl.
CPC ................................ *H04W 56/005* (2013.01)
(58) Field of Classification Search
CPC ............... H04W 56/005; H04W 56/00; H04W 56/0045; H04W 88/08
See application file for complete search history.

(56) References Cited

U.S. PATENT DOCUMENTS

| | | | | |
|---|---|---|---|---|
| 2019/0208366 | A1* | 7/2019 | Sosnin | G01S 13/876 |
| 2020/0053752 | A1* | 2/2020 | Huang | H04W 72/23 |
| 2020/0162211 | A1* | 5/2020 | Wang | H04L 5/0091 |
| 2022/0217664 | A1* | 7/2022 | Toeda | H04W 56/002 |
| 2022/0248358 | A1* | 8/2022 | Laddu | H04W 56/001 |
| 2023/0036797 | A1* | 2/2023 | Xu | H04W 56/0045 |
| 2023/0111603 | A1* | 4/2023 | Ghimire | H04B 7/0421 |
| | | | | 455/456.1 |
| 2023/0262635 | A1* | 8/2023 | Tan | H04W 56/0045 |
| | | | | 370/350 |

OTHER PUBLICATIONS

International Search Report issued in PCT/JP2020/037465 on Apr. 20, 2021 (10 pages).
Written Opinion of the International Searching Authority issued in PCT/JP2020/037465 on Apr. 20, 2021 (6 pages).
ZTE Corporation, et al.; "Enhancements for time synchronization in TSN"; 3GPP TSG-RAN WG2 Meeting #111, R2-2006831; E-meeting; Aug. 17-28, 2020 (10 pages).
Qualcomm Incorporated; "Propagation Delay Compensation for Reference Timing Delivery"; 3GPP TSG-RAN WG2 Meeting #111-e, R2-2006906; Electronic; Aug. 17-28, 2020 (7 pages).

(Continued)

*Primary Examiner* — Ivan O Latorre
(74) *Attorney, Agent, or Firm* — Osha Bergman Watanabe & Burton LLP

(57) ABSTRACT

A gNB (100) transmits and receives a prescribed message or response, acquires a propagation delay with the UE (200) in response to the reception of the message or response, and performs propagation delay compensation. The propagation delay compensation is performed at a DU (120) on the UE (200) side or at a CU (110) on the network side.

5 Claims, 17 Drawing Sheets

(56) References Cited

OTHER PUBLICATIONS

Ericsson; "Propagation Delay Compensation Enhancements for Time Synchronization"; 3GPP TSG-RAN WG1#102e, Tdoc R1-2005517; Electronic meeting; Aug. 17-28, 2020 (6 pages).
Nokia, et al.; "Discussion on enhancements for support of propagation delay compensation for accurate time synchronization"; 3GPP TSG RAN WG2 #111-e, R2-2006922; Online; Aug. 17-28, 2020 (8 pages).
OPPO; "Consideration of TSN time synchronization enhancements"; 3GPP TSG-RAN WG2 Meeting #111 electronic, R2-2007141; Online; Aug. 17-28, 2020 (4 pages).
Nokia, et al.; "Enhanced Industrial Internet of Things (IoT) and ultra-reliable and low latency communication (URLLC) support for NR"; 3GPP TSG RAN Meeting #88e, RP-201310; Electronic meeting; Jun. 29-Jul. 3, 2020 (6 pages).
3GPP TS 22.104 V17.3.0; "3rd Generation Partnership Project; Technical Specification Group Services and System Aspects; Service requirements for cyber-physical control applications in vertical domains; Stage 1 (Release 17)"; Jul. 2020 (76 pages).
Office Action issued in Chinese Application No. 202080105630.9, dated Jul. 25, 2024 (18 pages).
3GPP TS 38.473 V16.2.0; "3rd Generation Partnership Project; Technical Specification Group Radio Access Network; NG-RAN; F1 application protocol (F1AP) (Release 16)"; Jul. 2020 (3 pages).
Office Action issued in Chinese Application No. 202080105630.9, mailed Jan. 11, 2025 (10 pages).

\* cited by examiner

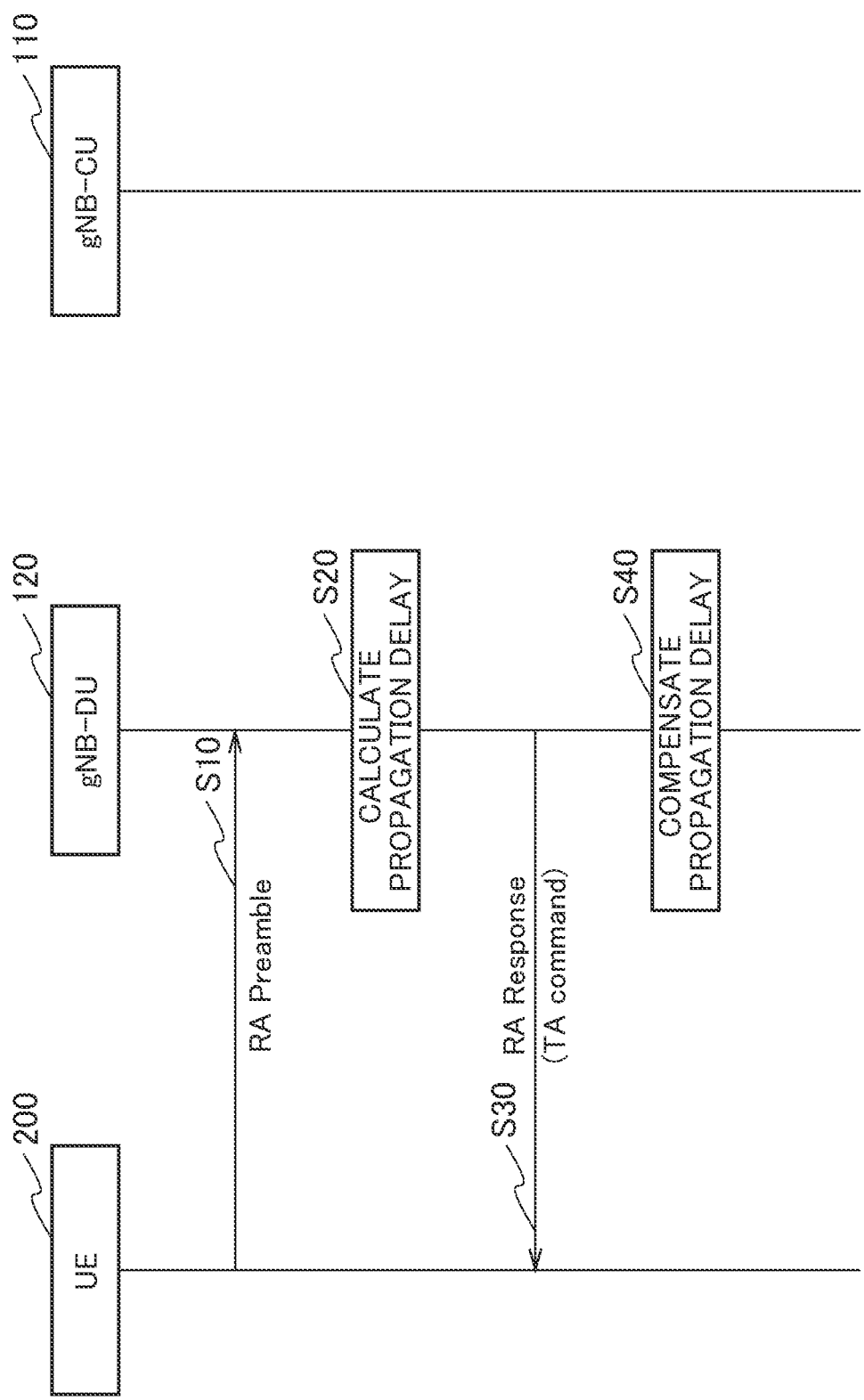

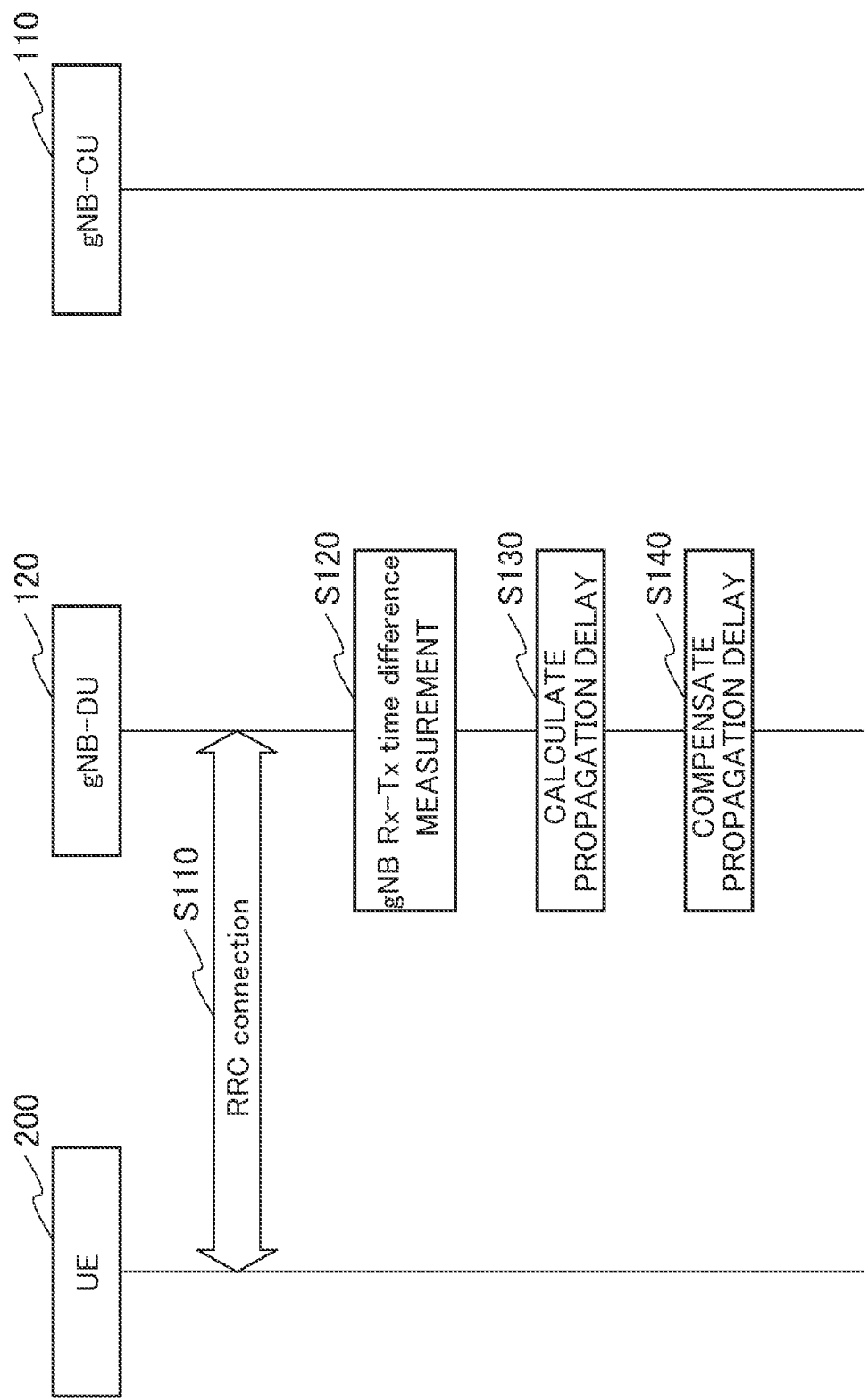

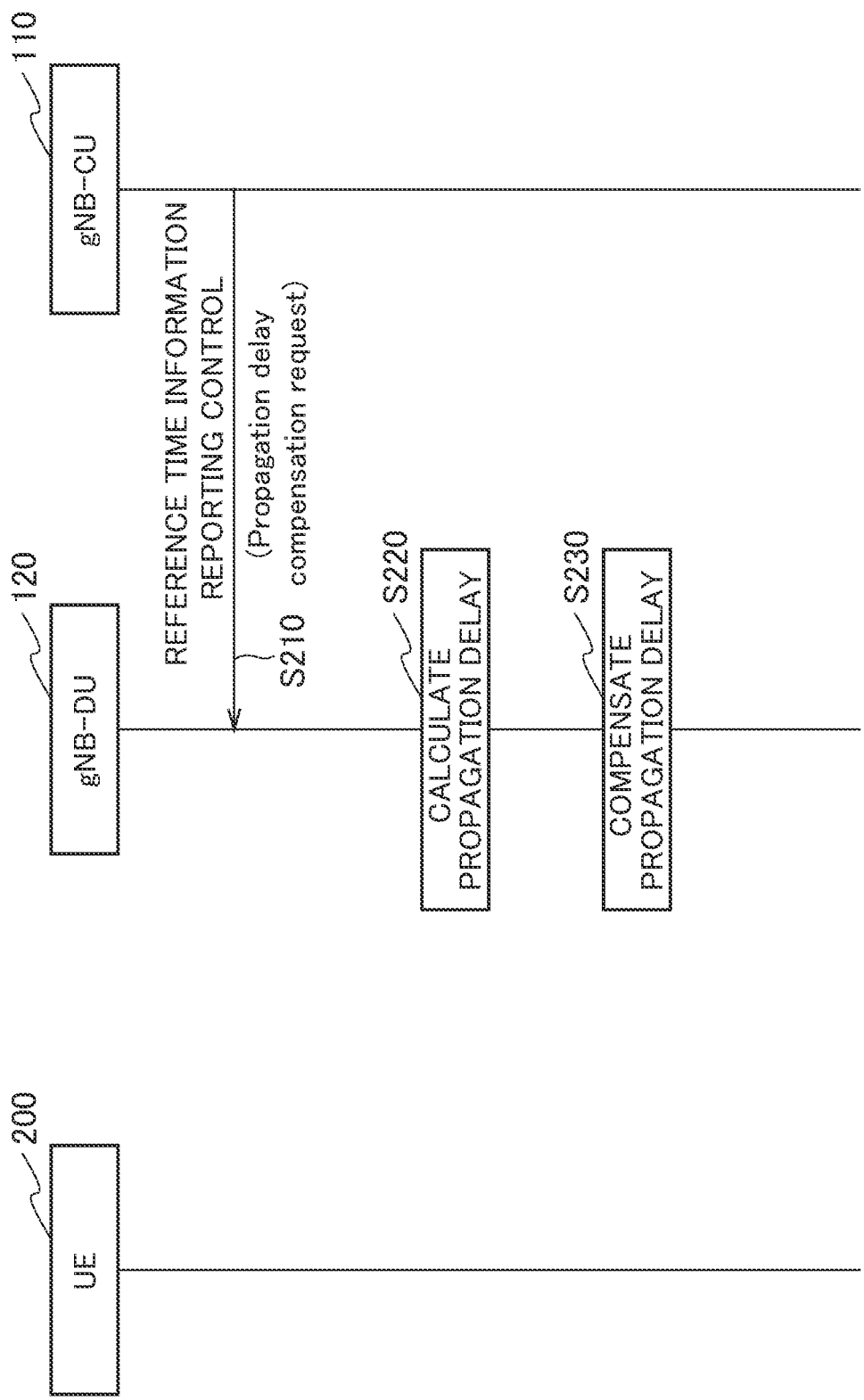

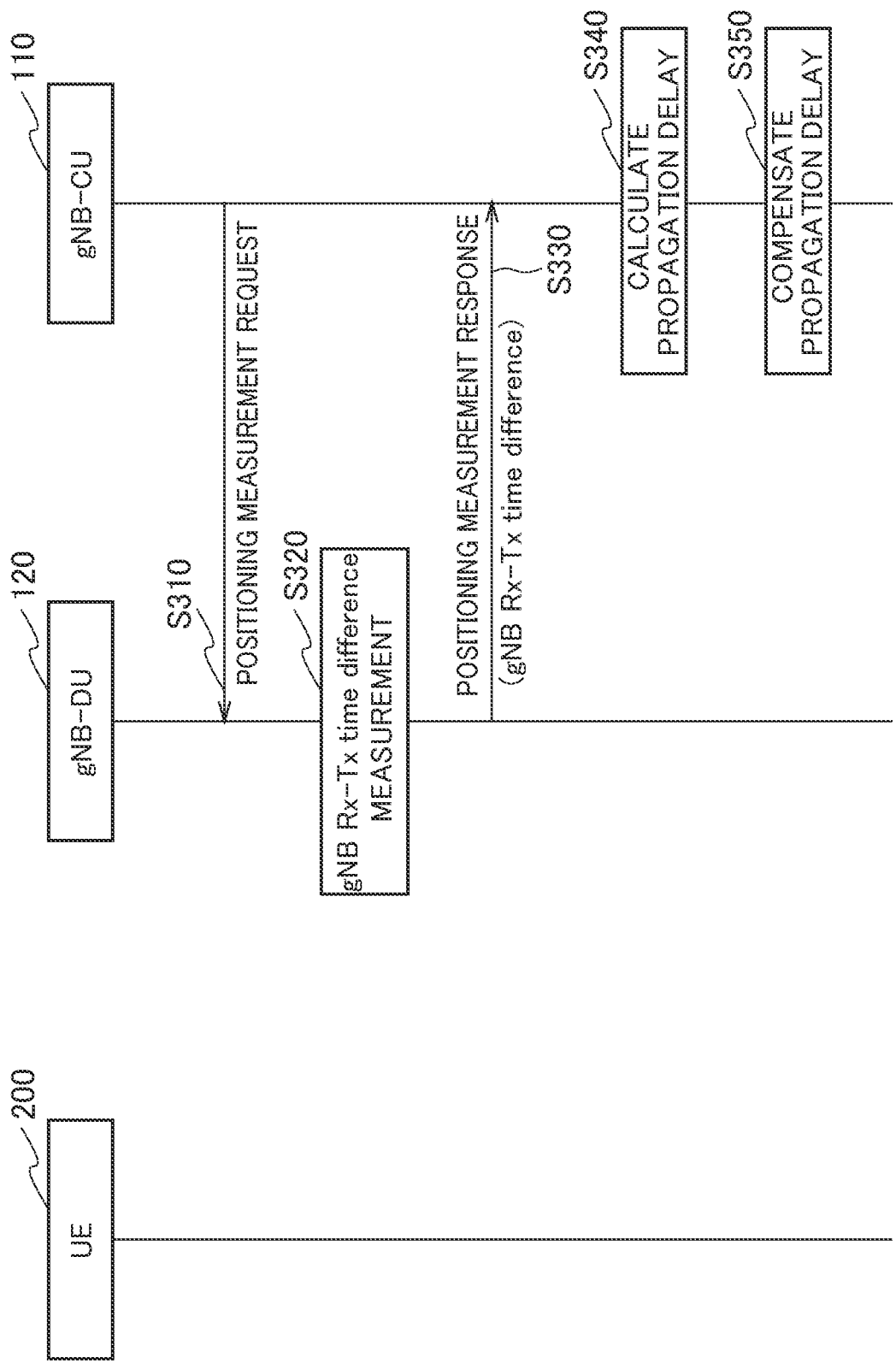

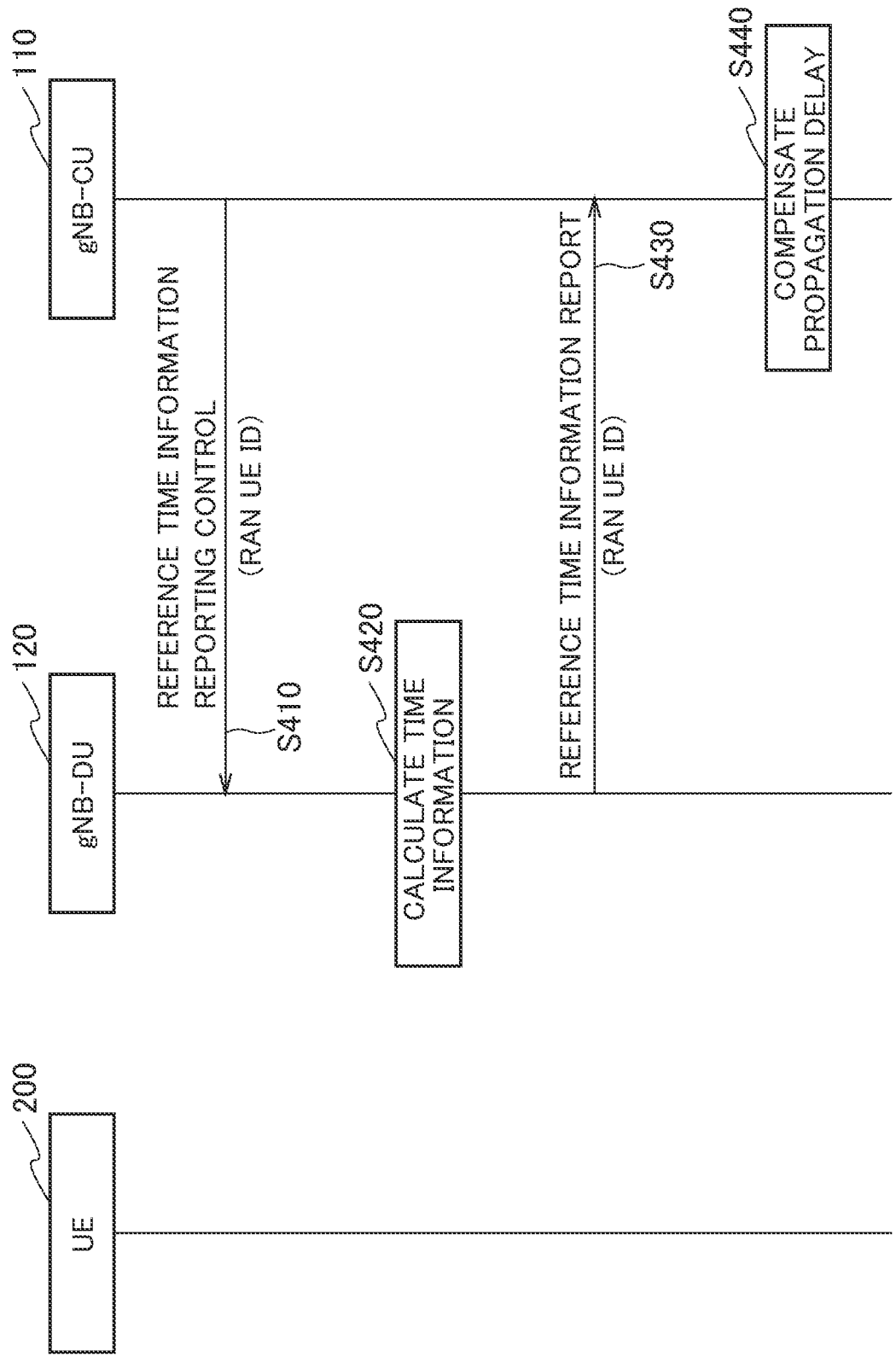

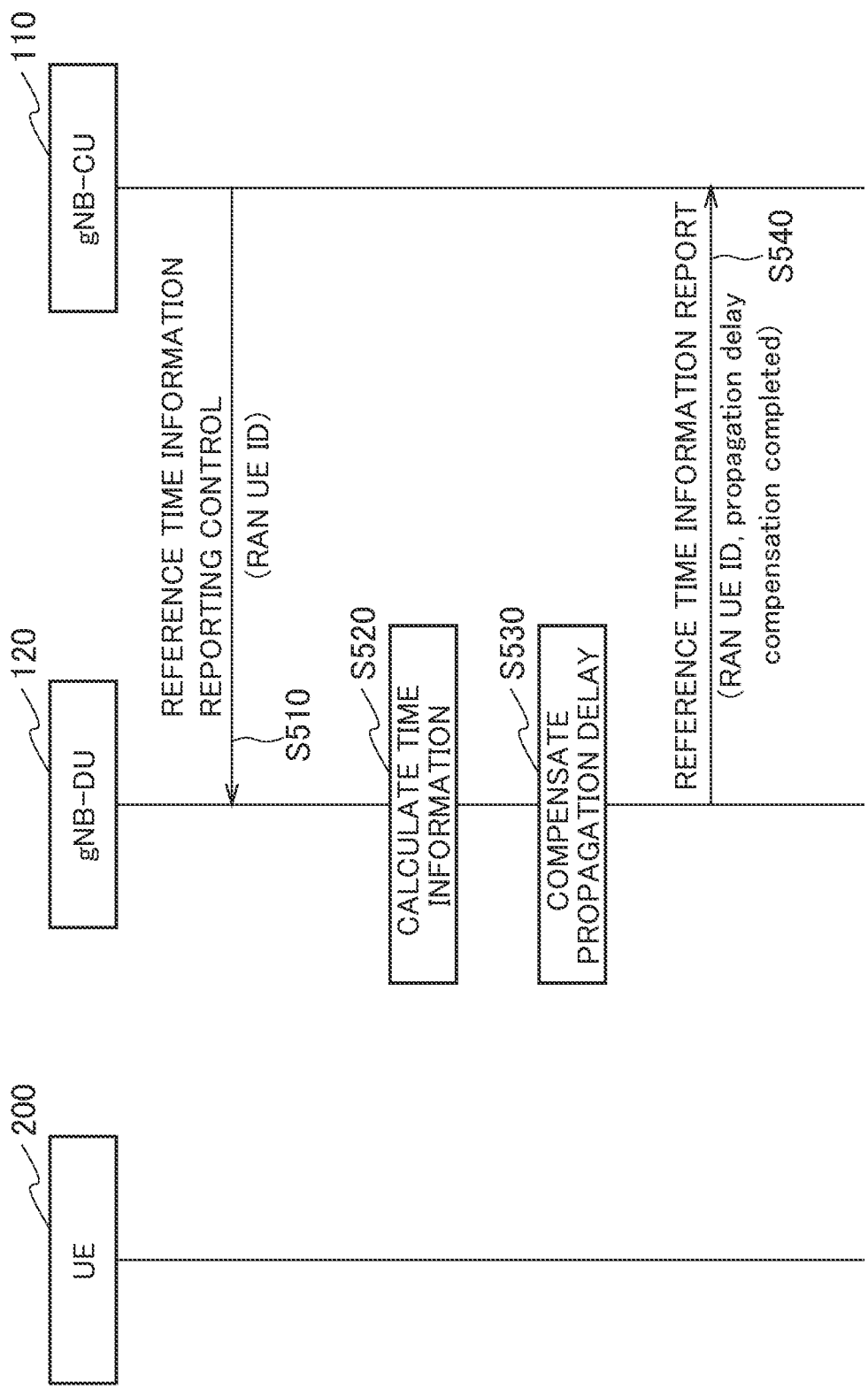

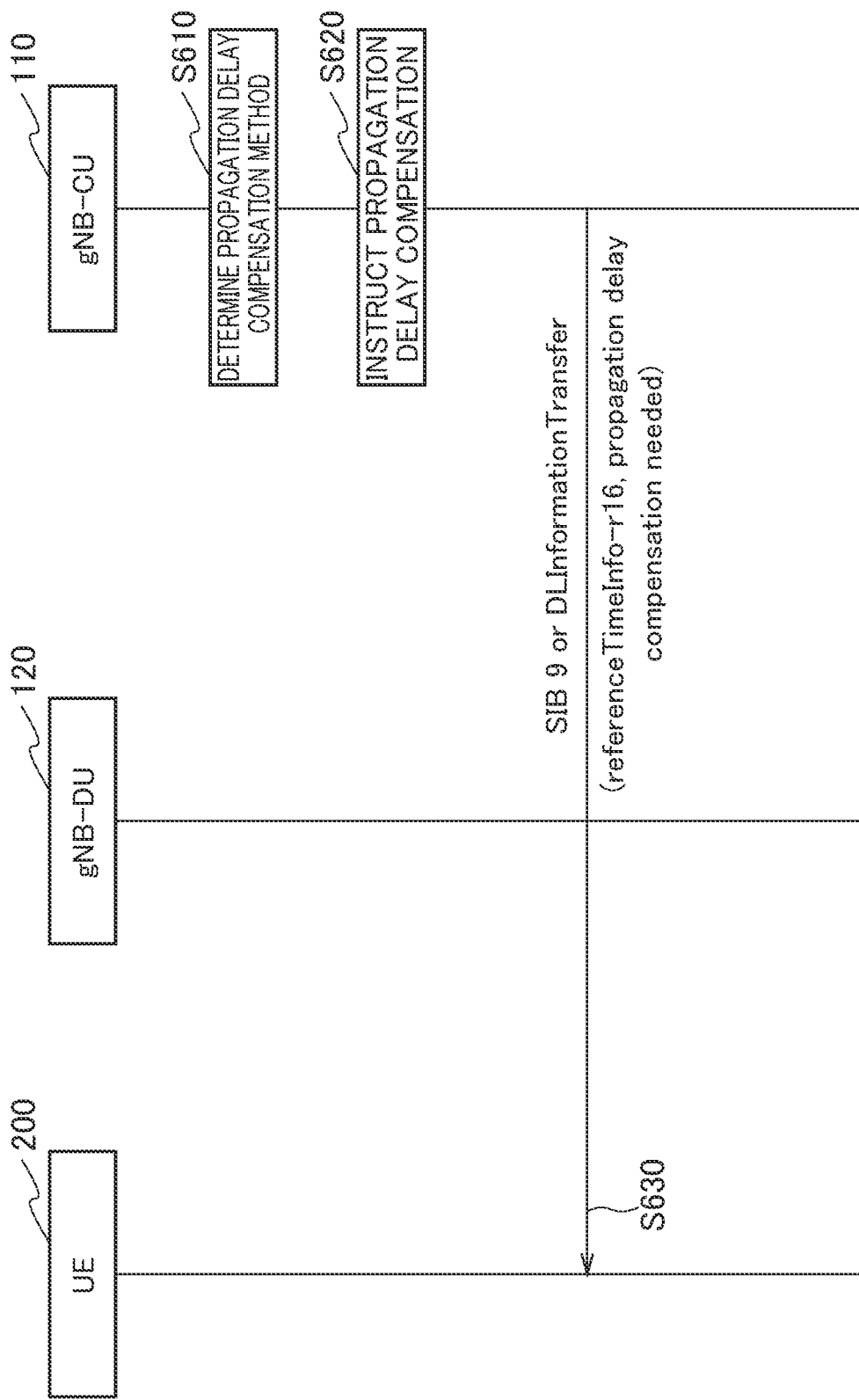

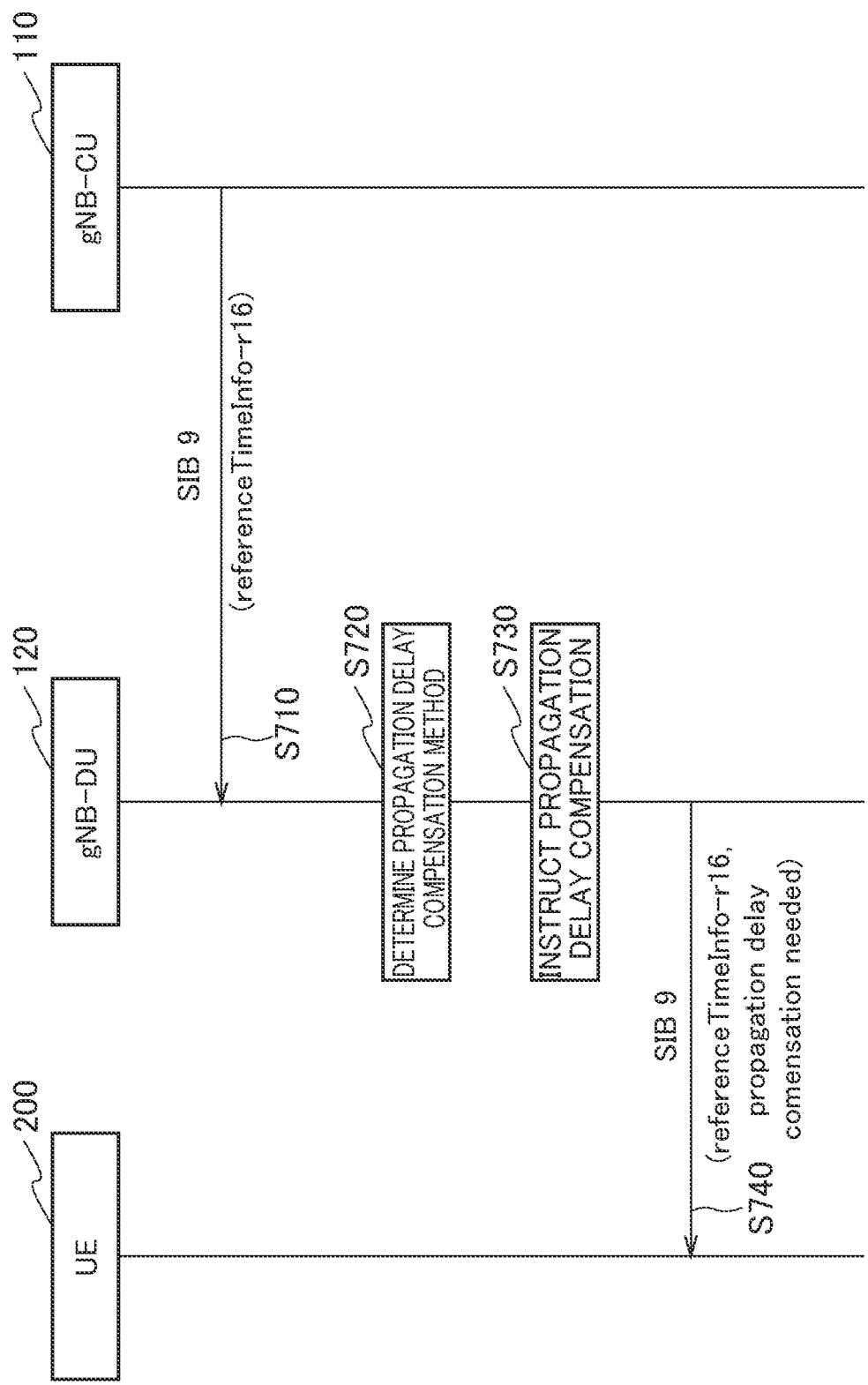

FIG. 13

| IE/Group Name | Presence | Range | IE type and reference | Semantics description |
|---|---|---|---|---|
| Event Type | M | | ENUMERATED (on demand, periodic, stop, ...) | |
| Report Periodicity Value | C-if Event TypeisPeriodic | | INTEGER (0..512, ...) | Indicates the periodicity of accurate reference time information report. Unit in radio frame. |
| Propagation delay compensation request | | | BOOLEAN | This field indicates whether the CU requests DU to conduct propagation delay compensation or not |

FIG. 14

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| Transaction ID | M | | 9.3.1.23 | | YES | ignore |
| Time Reference Information | M | | 9.3.1.148 | | YES | ignore |
| RAN UE ID | O | | OCTET STRING (SIZE (8)) | | | |
| Time Reference Information Per UE | O | | 9.3.1.148 | | YES | ignore |
| Propagation delay compensation needed | O | | BOOLEAN | This field indicates whether there is a request from DU to CU for propagation delay compensation or not | | |

FIG. 15

| IE/Group Name | Presence | Range | IE type and reference | Semantics description |
|---|---|---|---|---|
| Reference Time | M | | 9.3.1.149 | |
| Reference SFN | M | | INTEGER (0..1023) | |
| Uncertainty | O | | INTEGER (0..32767, ...) | This field indicates the uncertainty of the reference time information provided in ReferenceTimeInfo IE, refer to 6.3.2 of TS 38.331 [8] |
| Time Information Type | O | | ENUMERATED (localClock) | |
| Propagation delay compensation completed | O | | BOOLEAN | This field indicates whether the propagation delay compensation is already conducted by DU or not |

FIG. 16

DLInformationTransfer message

```
-- ASN1START
-- TAG-DLINFORMATIONTRANSFER-START

DLInformationTransfer ::=          SEQUENCE {
    rrc-TransactionIdentifier      RRC-TransactionIdentifier,
    criticalExtensions             CHOICE {
        dlInformationTransfer          DLInformationTransfer-IEs,
        criticalExtensionsFuture       SEQUENCE {}
    }
}

DLInformationTransfer-IEs ::=      SEQUENCE {
    dedicatedNAS-Message           DedicatedNAS-Message              OPTIONAL,  -- Need N
    lateNonCriticalExtension       OCTET STRING                      OPTIONAL,
    nonCriticalExtension           DLInformationTransfer-v1610-IEs   OPTIONAL
}

DLInformationTransfer-v1610-IEs ::= SEQUENCE {
    referenceTimeInfo-r16          ReferenceTimeInfo-r16             OPTIONAL,  -- Need R
    nonCriticalExtension           DLInformationTransfer-v17xy       OPTIONAL
}

DLInformationTransfer-v17xy-IEs ::= SEQUENCE {
    PropagationDelayCompensationNeeded   BOOLEAN                     OPTIONAL
    nonCriticalExtension           SEQUENCE {}                       OPTIONAL
}

-- TAG-DLINFORMATIONTRANSFER-STOP
-- ASN1STOP
```

| DLInformationTransferMRDC field descriptions |
|---|
| *PropagationDelayCompensationNeeded* |
| Indicates whether network request UE to conduct the propagation delay compensation or not. true indicates network request UE to conduct propagation delay compensation. |

FIG. 17

```
-- ASN1START
-- TAG-SIB9-START

SIB9 ::=                        SEQUENCE {
    timeInfo                        SEQUENCE {
        timeInfoUTC                     INTEGER (0..549755813887),
        dayLightSavingTime              BIT STRING (SIZE (2))       OPTIONAL,   -- Need R
        leapSeconds                     INTEGER (-127..128)         OPTIONAL,   -- Need R
        localTimeOffset                 INTEGER (-63..64)           OPTIONAL,   -- Need R
    }
    lateNonCriticalExtension        OCTET STRING                    OPTIONAL,
    ...,
    [[
    referenceTimeInfo-r16           ReferenceTimeInfo-r16                       -- Need R
    ]],
    [[
    PropagationDelayCompensationNeeded  BOOLEAN
    ]]
}

-- TAG-SIB9-STOP
-- ASN1STOP
```

| SIB9 field descriptions |
|---|
| *dayLightSavingTime* |
| Indicates if and how daylight-saving time (DST) is applied to obtain the local time. The semantics are the same as the semantics of the *Daylight Saving Time* IE in TS 24.501 [23] and TS 24.008 [38]. The first/leftmost bit of the bit string contains the b2 of octet 3 and the second bit of the bit string contains b1 of octet 3 in the value part of the *Daylight Saving Time* IE in TS 24.008 [38]. |
| *leapSeconds* |
| Number of leap seconds offset between GPS Time and UTC. UTC and GPS time are related i.e. GPS time -leapSeconds = UTC time. |
| *localTimeOffset* |
| Offset between UTC and local time in units of 15 minutes. Actual value = field value * 15 minutes. Local time of the day is calculated as UTC time + localTimeOffset. |
| *PropagationDelayCompensationNeeded* |
| Indicates whether network request UE to conduct the propagation delay compensation or not. true indicates network request UE to conduct propagation delay compensation. |
| *timeInfoUTC* |
| Coordinated Universal Time corresponding to the SFN boundary at or immediately after the ending boundary of the SI-window in which SIB9 is transmitted. The field counts the number of UTC seconds in 10 ms units since 00:00:00 on Gregorian calendar date 1 January, 1900 (midnight between Sunday, December 31, 1899 and Monday, January 1, 1900). See NOTE 1. This field is excluded when determining changes in system information, i.e. changes of *timeInfoUTC* should neither result in system information change notifications nor in a modification of *valueTag* in *SIB1*. |

PROPAGATION DELAY COMPENSATION SYSTEM IN RADIO BASE STATION

TECHNICAL FIELD

The present disclosure relates to a radio base station capable of compensating for propagation delay with a terminal.

BACKGROUND ART

3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

In 3GPP Release-17, with regard to support for Industrial Internet of Things (IIoT) and URLLC (Ultra-Reliable and Low Latency Communications), the goal is to realize even higher precision synchronization between a radio base station (gNB) and a terminal (User Equipment, UE) (Non-Patent Literature 1).

For example, in a use case such as a smart grid, since high synchronization accuracy in a wide service area is required (Non-Patent Literature 2), compensation of propagation delay in the radio section between UE and gNB is indispensable.

When high synchronization accuracy in such a wide service area is required, it is conceivable to perform propagation delay compensation between the UE and the gNB (Specifically, between UE and DU) while applying a CU-DU split gNB deployment in which a CU (Central Unit) and a DU (Distributed Unit) of the gNB are arranged separately.

CITATION LIST

Non-Patent Literature

Non-Patent Literature 1 "Enhanced Industrial Internet of Things (IoT) and ultra-reliable and low latency communication (URLLC) support for NR", RP-201310, 3GPP TSG RAN Meeting #88e, 3GPP, July 2020

Non-Patent Literature 2

3GPP TS 22.104 V 17.3.0, 3rd Generation Partnership Project; Technical Specification Group Services and System Aspects; Service requirements for cyber-physical control applications in vertical domains; Stage 1 (Release 17), 3GPP, July 2020

SUMMARY OF INVENTION

However, according to the current 3GPP specifications (Release-16), there is a problem that it is difficult for the CU and DU of the radio base station to properly cooperate to compensate for the propagation delay between the UE and the gNB.

Accordingly, the following disclosure has been made in view of such a situation, and it is an object of the present invention to provide a radio base station capable of compensating for propagation delay in a radio section with a terminal (UE) while responding to a demand for high synchronization accuracy in a wide service area.

One aspect of the present disclosure is a radio base station (gNB 100) including a transmission/reception unit (For example, Message transmission/reception unit 117) that transmits and receives a prescribed message or response, and a control unit (For example, delay compensation control unit 115) that, in response to receipt of the message or response, acquires a propagation delay with a terminal (UE 200) and performs propagation delay compensation. The propagation delay compensation is executed in a communication unit (DU 120) on the terminal side or a communication unit (CU 110) on the network side.

One aspect of the present disclosure is a radio base station (gNB 100) including a transmission/reception unit (radio transmission unit 121 and radio reception unit 123) that transmits and receives a radio signal, and a control unit (delay compensation control unit 125) that acquires a propagation delay with a terminal based on a time difference between reception and transmission of the radio signal and performs propagation delay compensation. The propagation delay compensation is executed in a communication unit (DU 120) on the terminal side.

One aspect of the present disclosure is a radio base station (gNB 100) including a reception unit (message transmission/reception unit 128) that receives a control message for time information including identification information of a terminal (UE 200), and a transmission unit (message transmission/reception unit 128) that transmits the time information adjusted based on a propagation delay with the terminal associated with the identification information.

One aspect of the present disclosure is a radio base station (gNB 100) including a reception unit (message transmission/reception unit 128) that receives a control message for time information including identification information of a terminal (UE 200), and a transmission unit (message transmission/reception unit 128) that transmits a response message including compensation information indicating whether or not propagation delay compensation with the terminal associated with the identification information has been performed.

One aspect of the present disclosure is a radio base station (gNB 100) including a transmission unit (For example, Message transmission/reception unit 117) that transmits a message related to system information or a downlink that includes time information used in a system, and a control unit (For example, delay compensation control unit 115) that includes in the system information or the message to a terminal (UE 200) whether or not an instruction of propagation delay compensation with the terminal is necessary.

BRIEF DESCRIPTION OF DRAWINGS

FIG. 5 is a diagram showing the sequence of propagation delay compensation according to the operation example 1-1.

FIG. 6 is a diagram showing the sequence of propagation delay compensation according to the operation example 1-2.

FIG. 7 is a diagram showing the sequence of propagation delay compensation according to the operation example 1-3.

FIG. 8 is a diagram showing the sequence of propagation delay compensation according to the operation example 1-4.

FIG. 9 is a diagram showing a sequence of propagation delay compensation according to operation example 2.

FIG. 10 is a diagram showing a sequence of propagation delay compensation according to operation example 3.

FIG. 11 is a diagram showing a sequence (unit 1) of propagation delay compensation according to operation example 4.

FIG. 12 is a diagram showing a sequence (unit 2) of propagation delay compensation according to operation example 4.

FIG. 13 is a diagram showing an example of the configuration of information elements included in the Reporting Request Type of the REFERENCE TIME INFORMATION REPORTING CONTROL.

FIG. 14 is a diagram showing an example of the configuration of the information elements included in the REFERENCE TIME INFORMATION REPORT.

FIG. 15 is a diagram showing a configuration example of an information element included in Time Reference Information of REFERENCE TIME INFORMATION REPORT.

FIG. 16 is a diagram showing a configuration example of the DLInformationTransfer msg.

FIG. 17 is a diagram showing a configuration example of the SIB 9.

MODES FOR CARRYING OUT THE INVENTION

Figure 1:
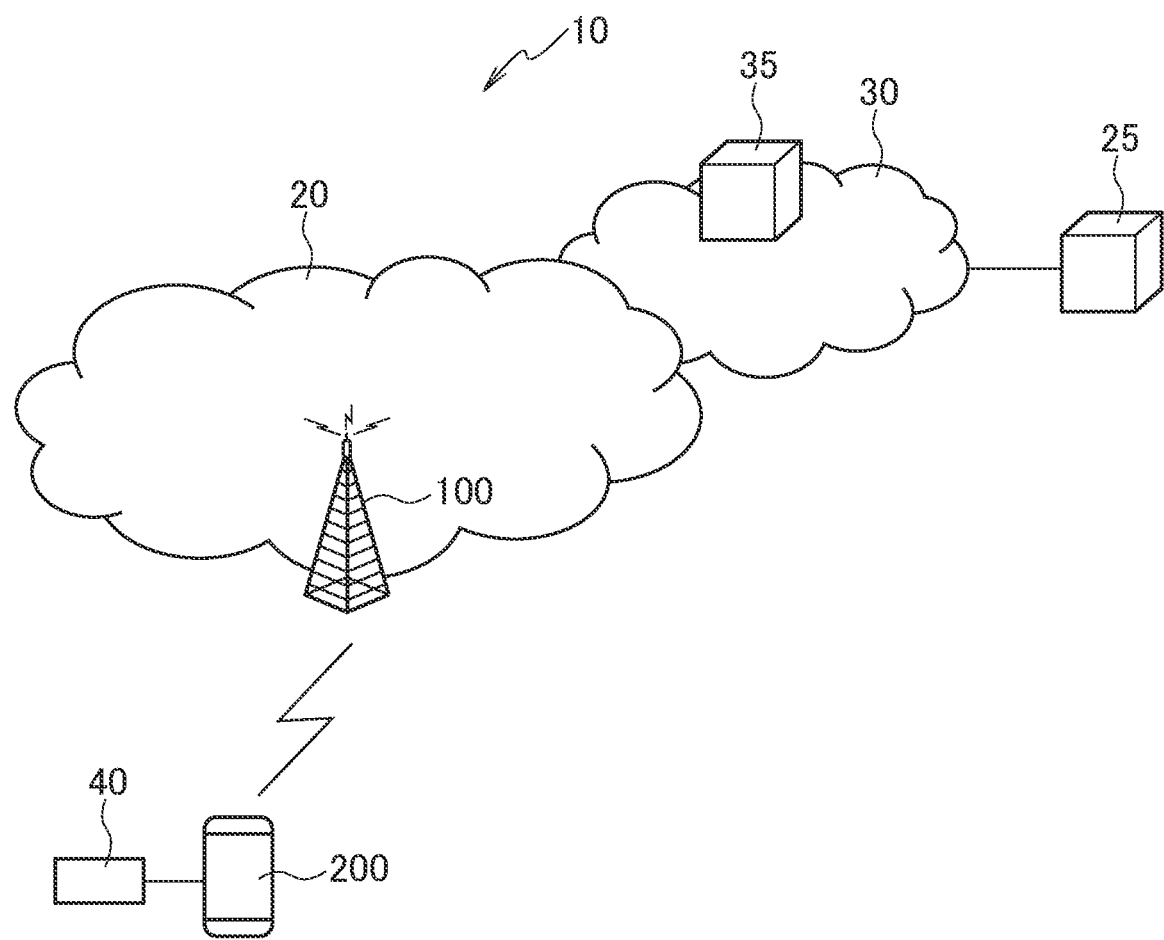
FIG. 1 is an overall schematic configuration diagram of radio communication system 10.

Exemplary embodiments of the present invention are explained below with reference to the accompanying drawings. Note that, the same or similar reference numerals have been attached to the same functions and configurations, and the description thereof is appropriately omitted.

(1) Overall Schematic Configuration of the Radio Communication System

FIG. 1 is an overall schematic configuration diagram of a radio communication system 10 according to this embodiment. radio communication system 10 is a 5G New Radio (NR) compliant radio communication system and includes a Next Generation-Radio Access Network 20 (User Equipment 200, hereinafter UE 200), NG-RAN 20, and user terminal 200.

The radio communication system 10 may be a radio communication system that follows a scheme called Beyond 5G, 5G Evolution or 6G.

The NG-RAN 20 includes a radio base station 100 (hereinafter, gNB 100). The specific configuration of radio communication system 10 including the number of gNBs and UEs is not limited to the example shown in FIG. 1.

The NG-RAN 20 actually includes a plurality of NG-RAN Nodes, specifically, gNBs (or ng-eNBs), and is connected to the 5GC 30, which is a core network according to 5G. The NG-RAN 20 and the 5GC 30 may be expressed simply as a "network".

The 5GC 30 may be provided with a User Plane Function 35 (hereinafter, UPF 35) that is included in the 5G system architecture and provides user plane functionality. The UPF 35 may be connected via a specific interface to a TSN grandmaster 25 (TSC GM 25) that provides time information used in a Time Sensitive Network (TSN). The TSC GM 25 can provide highly accurate time information (date and time) to the IoT device 40 connected to the UE 200 via the NG-RAN 20 or the like. The IoT device 40 may be referred to as an end station or the like.

For example, TSN may be used as a network for Industrial Internet of Things (IIoT). The TSN may be configured as a separate network from the NG-RAN 20 and 5GC 30, i.e., the NR (5G) system, and may be synchronized with the timing of independent clock generation.

The TSN may include networks associated with services that require high synchronization accuracy in a wide service area, such as a smart grid.

The gNB 100 is a radio base station according to NR, and executes radio communication according to the UE 200 and NR. By controlling radio signals transmitted from a plurality of antenna elements, the gNB 100 and the UE 200 can support Massive MIMO that generates a beam with higher directivity, carrier aggregation (CA) that uses a plurality of component carriers (CCs) bundled together, and dual connectivity (DC) that simultaneously communicates between the UE and each of a plurality of NG-RAN nodes.

The IoT device 40 may be a TSN, for example, a communication device (terminal) included in the IIoT, and may be synchronized with timing (time information) in the TSN.

Thus, in the present embodiment, the TSC GM 25 and the IoT device 40 can be connected to the NR (5G) system, providing a mechanism for compensating for the propagation delay between the UE 200 and the gNB 100.

Figure 2:
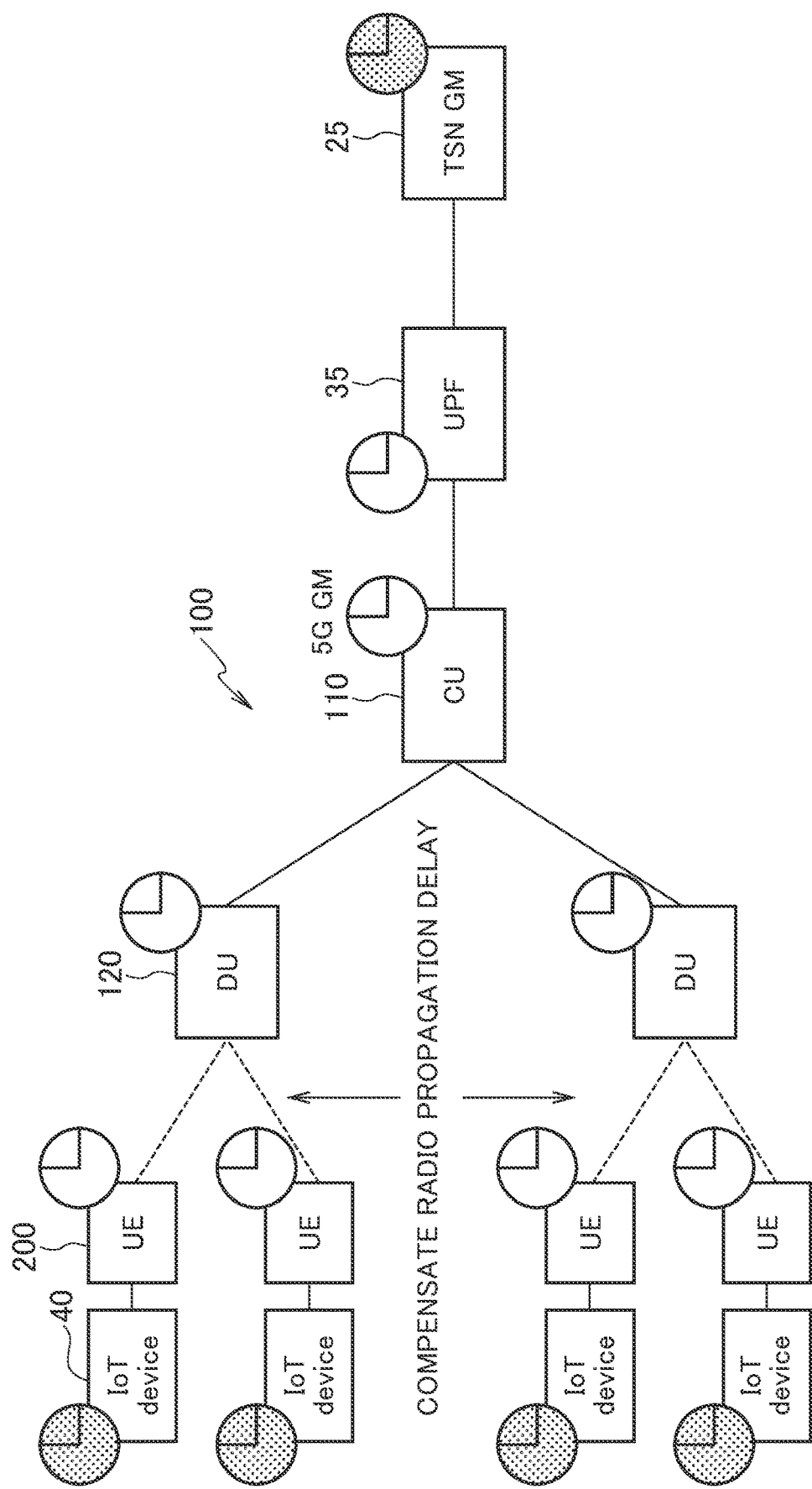
FIG. 2 is a diagram showing an example of TSN support by radio communication system 10.

FIG. 2 shows an example of TSN support by radio communication system 10. As shown in FIG. 2, the gNB 100 may comprise a central unit 110 (CU 110) and a distributed unit 120 (hereinafter DU 120). A plurality of DUs 120 may be connected to the CU 110. A wired system (For example, Ethernet (R).) may be used for connection between the CU 110 and the DU 120. Note that a radio system may be used for the connection between the CU 110 and the DU 120.

IoT device 40 connected to UE 200 can operate in synchronization with TSN time information provided by TSC GM 25 (see clock icon in the figure). On the other hand, in a NR (5G) system, a 5G grand master (5G GM) provides time information used in the system. The UPF 35, CU 110, DU 120 and UE 200 can operate in synchronization with the time information of the 5G GM.

The radio communication system 10 may cover a wide service area (For example, up to 20 km²) by applying a CU-DU split gNB deployment where the CU 110 and a plurality of DUs 120 are geographically separated when high synchronization accuracy is required in a wide service area such as a smart grid.

In addition, in order to achieve high synchronization accuracy (For example, less than 1 µs), the propagation delay between the UE 200 and the gNB 100 can be compensated. Specifically, radio communication system 10 can compensate for the propagation delay in the radio section between the UE 200 and the DU 120 to which the UE 200 is connected. The propagation delay compensation can be interpreted as adjusting the time information for the TSN according to the propagation delay amount of the radio section, so that each of the IoT devices 40 can operate in synchronization with the time information for the TSN. More specifically, it may be interpreted as adjusting the propagation delay between the UE 200 and the gNB 100 (DU 120) to the time information acquired by subtracting the propagation delay from the time information for the TSN.

Alternatively, the propagation delay compensation may be interpreted as adjusting the propagation delay between the UE 200 and the gNB 100 (DU 120) (radio section) to the time information acquired by subtracting the propagation delay from the time information of the 5G GM, or it may be interpreted as allowing the 5G system to act as a TSN bridge and each TSN IoT device to operate in synchronization with the time for TSN if accurate synchronization can be maintained within the 5G system.

(2) Function Block Configuration of Radio Communication System

Next, the functional block configuration of the radio communication system 10 will be described. Specifically, the functional block configurations of the CU 110 and the DU 120 constituting the gNB 100 will be described.

(2.1) CU 110

Figure 3:
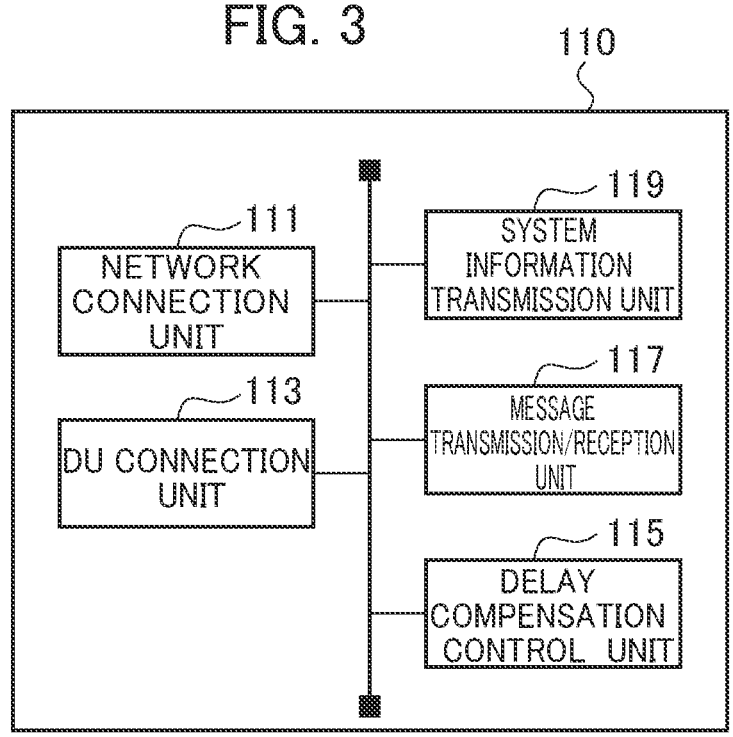
FIG. 3 is a functional block diagram of the CU 110.

FIG. 3 is a functional block diagram of the CU 110. As shown in FIG. 3, the CU 110 includes a network connection unit 111, a DU connection unit 113, a delay compensation control unit 115, a message transmission/reception unit 117, and a system information transmission unit 119.

The network connection unit 111 provides a network, specifically, a communication interface with other communication nodes constituting the NG-RAN 20 and a communication interface with communication nodes constituting the 5GC 30. For example, the communication interface may include N2, N3, etc.

The DU connection unit 113 provides a communication interface with the DU 120. For example, the communication interface may include F1 or the like. Specifically, the DU connection unit 113 can provide a communication interface (e.g., Ethernet®) for wire-connecting a plurality of DUs 120.

The delay compensation control unit 115 performs control for compensation of propagation delay between UE 200 and gNB 100. In this embodiment, the delay compensation control unit 115 may constitute a control unit.

In particular, the delay compensation control unit 115 may acquire a propagation delay with UE 200 based on a specified message transmitted or received by the message transmission/reception unit 117.

For example, the delay compensation control unit 115 can calculate the propagation delay between the UE 200 and the gNB 100 (Specifically, DU 120) based on the value of the gNB Rx-Tx time difference transmitted from the DU 120. The gNB Rx-Tx time difference may be interpreted as a difference (time difference) between the reception timing and the transmission timing of a predetermined sub-frame in the gNB 100 (DU 120). The gNB Rx-Tx time difference is specified in Section 3GPP TS 38.215 5.2.3. The gNB Rx-Tx time difference will be described later.

In this manner, the delay compensation control unit 115 can acquire a propagation delay with the UE 200 and perform propagation delay compensation in response to receipt of a message or response, such as a gNB Rx-Tx time difference. As will be described later, the propagation delay compensation may be performed in the DU 120, which is a communication unit on the UE 200 side, or in the CU 110, which is a communication unit on the network side.

In addition, the delay compensation control unit 115 can include in the system information or a message related to the downlink, specifically, DLInformationTransfer msg., whether or not to instruct the UE 200 to compensate for the propagation delay with each UE 200. The system information (SIB) can be transmitted (reported) to the UE 200 by the system information transmission unit 119, as described later. The UE 200 may perform propagation delay compensation based on such system information or downlink messages.

The message transmission/reception unit 117 sends and receives the specified message or response. In this embodiment, the message transmission/reception unit 117 may constitute a transmission/reception unit.

Specifically, the message transmission/reception unit 117 may send a POSITIONING MEASUREMENT REQUEST to the DU 120 and receive a POSITIONING MEASUREMENT RESPONSE from the DU 120 that is a response to the POSITIONING MEASUREMENT REQUEST. The POSITIONING MEASUREMENT RESPONSE may include the gNB Rx-Tx time difference. The POSITIONING MEASUREMENT REQUEST and POSITIONING MEASUREMENT RESPONSE are specified in 3GPP TS 38.473.

The message transmission/reception unit 117 can transmit a REFERENCE TIME INFORMATION REPORTING CONTROL, which is one of the F1 messages specified in the 3GPP TS 38.473, to the DU 120, and can receive a REFERENCE TIME INFORMATION REPORT from the DU 120, which is a response to the REFERENCE TIME INFORMATION REPORTING CONTROL. The REFERENCE TIME INFORMATION REPORTING CONTROL may include a Propagation delay compensation request that instructs DU 120 to perform propagation delay compensation.

In addition, the message transmission/reception unit 117 may send downlink related messages, which may include time information, specifically a unicast message, DLInformationTransfer msg., to UE 200 via DU 120. In this embodiment, the message transmission/reception unit 117 may constitute a transmission unit.

These messages are illustrative and may be different messages as long as they are transmitted and received by the CU 110 to the DU 120.

The system information transmission unit 119 transmits system information to be reported, that is, broadcasted, into a cell formed by the gNB 100. The system information may be referred to as a System Information Block (SIB). In particular, in this embodiment, the system information transmission unit 119 can broadcast the SIB 9 including an information element (IE) called referenceTimeInfo-r16 into the cell via the DU 120. referenceTimeInfo-r16 indicates NR (5G) internal system clock (may be referred to as time or timing).

That is, the system information transmission unit 119 can transmit the system information transmission unit 119 including the time information used in radio communication system 10. In this embodiment, the system information transmission unit 119 may constitute a transmission unit.

(2.2) DU 120

Figure 4:
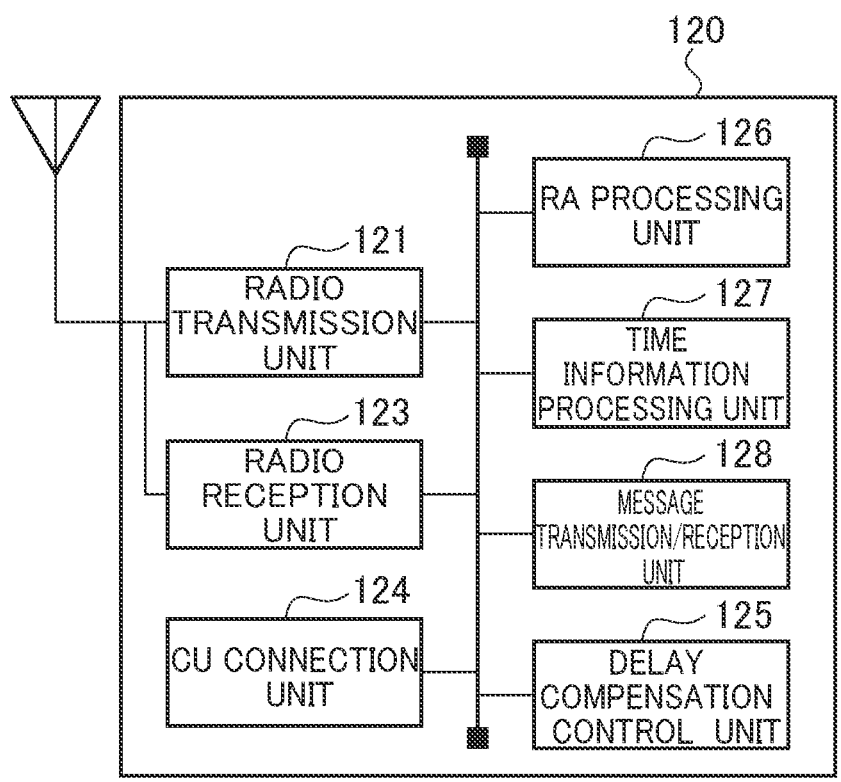
FIG. 4 is a functional block diagram of the DU 120.

FIG. 4 is a functional block diagram of the DU 120. As shown in FIG. 4, the DU 120 includes a radio transmission unit 121, a radio reception unit 123, a CU connection unit 124, a delay compensation control unit 125, an RA processing unit 126, a time information processing unit 127, and a message transmission/reception unit 128.

The radio transmission unit 121 transmits a radio signal in accordance with NR toward the UE 200. The radio reception unit 123 receives a radio signal transmitted from the UE 200 and complying with NR. In this embodiment, the radio transmission unit 121 and the radio reception unit 123 may constitute a transmission/reception unit for transmitting and receiving radio signals.

The CU connection unit 124 provides a communication interface with the CU 110. As described above, the communication interface may include F1 or the like, and the CU connection unit 124 may provide a communication interface for wired connection with the CU 110.

Similar to the delay compensation control unit 115 of the CU 110, the delay compensation control unit 125 performs control regarding compensation of the propagation delay between the UE 200 and the gNB 100. In this embodiment, the delay compensation control unit 125 may constitute a control unit.

Specifically, the delay compensation control unit 125 can acquire the propagation delay with the UE 200 based on the time difference between the reception and transmission of the radio signal and perform the propagation delay compensation. The time difference between the reception and transmission of the radio signal may be the above-mentioned gNB Rx–Tx time difference. A radio signal may be interpreted as a radio frame, subframe, slot or symbol. Alternatively, the radio signal may be replaced with a message of an upper layer (For example, the radio resource control layer (RRC)) or the like.

The propagation delay compensation may be realized by the same operation as the CU 110. That is, the delay compensation control unit 125 may also acquire a propagation delay with UE 200 and perform propagation delay compensation in response to receipt of a message or response.

Specifically, the delay compensation control unit 125 may perform propagation delay compensation in response to receipt of a random access preamble (msg.1) from the UE 200 in a random access procedure (RA procedure). Note that execution in response to reception may be performed at the same time as reception, or may be performed within a predetermined time after reception.

More specifically, when receiving a random access preamble (msg.1), the delay compensation control unit 125 may calculate a timing advance (TA) command, calculate a UE specific propagation delay for each UE 200, and perform propagation delay compensation.

The delay compensation control unit 125 may perform propagation delay compensation in response to receipt of a REFERENCE TIME INFORMATION REPORTING CONTROL (control message) transmitted from the CU 110. The purpose of the REFERENCE TIME INFORMATION REPORTING CONTROL is to instruct the DU 120 to transmit the requested accurate Time Reference Information to the CU 110.

In this embodiment, the REFERENCE TIME INFORMATION REPORTING CONTROL may include an information element (IE) that instructs the DU 120 to perform propagation delay compensation. The IE may be referred to, for example, as a Propagation delay compensation request.

As described above, in this embodiment, the propagation delay compensation may be performed in the DU 120, which is a communication unit on the UE 200 side.

Further, the delay compensation control unit 125 can include in the system information (SIB 9) whether it is necessary to instruct the UE 200 to compensate for the propagation delay with each UE 200.

The RA processing unit 126 executes processing related to the RA procedure with the UE 200. Specifically, the RA processor 126 may support a contention-based RA procedure (CBRA) and a contention-free RA procedure (CFRA). The RA processing unit 126 may support RA procedures of 4 steps and 2 steps.

The RA processing unit 126 can execute the RA procedure based on the random access preamble (msg.1) received by the message transmission/reception unit 128 from the UE 200. The RA procedure may include transmitting a random access response (msg.2) to the UE 200, receiving a scheduled transmission (msg.3), and transmitting a contention resolution (msg.4).

The time information processing unit 127 executes processing related to time information (5G GM reference) used in radio communication system 10 and time information for TSN (TSC GM 25 reference).

Specifically, the time information processing unit 127 may adjust the time information for the TSN based on the propagation delay with the UE 200 associated with the identification information (which may be referred to as the RAN UE ID) of the UE 200 included in the REFERENCE TIME INFORMATION REPORTING CONTROL. Specifically, as described above, it can be interpreted that the propagation delay is adjusted to the time information acquired by subtracting the propagation delay from the time information for TSN.

The message transmission/reception unit 128 sends and receives the specified message or response. In this embodiment, the message transmission/reception unit 128 may constitute a transmission/reception unit.

Specifically, the message transmission/reception unit 128 may receive messages regarding RA procedures, more specifically, random access preambles (msg.1), and the like.

The message transmission/reception unit 128 may also send a POSITIONING MEASUREMENT RESPONSE to the CU 110 containing the value of the gNB Rx–Tx time difference acquired by the delay compensation control unit 125.

The message transmission/reception unit 128 may also receive time information control messages. In this embodiment, the message transmission/reception unit 128 may constitute a reception unit. Specifically, the message transmission/reception unit 128 may receive a REFERENCE TIME INFORMATION REPORTING CONTROL from the CU 110. The REFERENCE TIME INFORMATION REPORTING CONTROL may include a RAN UE ID as identification information that can uniquely identify each UE 200. Note that, as long as the identification information can uniquely identify each of the UEs 200, it is not limited to the RAN UE ID, and other IDs may be used.

The message transmission/reception unit 128 can receive a control message (REFERENCE TIME INFORMATION REPORTING CONTROL) of time information including identification information of the identification information (RAN UE ID) of the UE 200.

The message transmission/reception unit 128 can transmit the time information adjusted by the time information processing unit 127 to the CU 110. Specifically, the message transmission/reception unit 128 can transmit time information adjusted based on the propagation delay between a particular RAN UE ID and the associated UE 200. In this embodiment, the message transmission/reception unit 128 may constitute a transmission unit. The time information may be included in REFERENCE TIME INFORMATION REPORT, which is a response message to REFERENCE TIME INFORMATION REPORTING CONTROL.

Furthermore, the message transmission/reception unit 128 can send a response message (REFERENCE TIME INFORMATION REPORT) containing compensation information indicating whether or not propagation delay compensation has been performed with the UE 200 associated with the particular RAN UE ID.

Specifically, the message transmission/reception unit 128 may send a REFERENCE TIME INFORMATION REPORT containing an Information Element (IE) of compensation information. The IE may be referred to as Propagation delay compensation needed, or Propagation delay compensation completed, or the like.

Furthermore, the message transmission/reception unit 128 can transmit (relay) the system information (SIB 9) and the DLInformationTransfer msg. transmitted from the CU 110 to the UE 200.

(3) Operation of Radio Communication System

Next, the operation of radio communication system 10 will be described. Specifically, an operation related to propagation delay compensation in CU-DU split gNB deployment will be described.

(3.1) Assumptions

Table 1 shows the contents of Clock synchronization service performance requirements as specified in Section 3GPP TS 22.104 5.6.2.

CU 110 and the DU 120 performs the compensation, and double compensation or compensation may not be performed.

(Issue 2): Since both REFERENCE TIME INFORMATION REPORTING CONTROL and REFERENCE TIME INFORMATION REPORT, which are the F1 messages specified in 3GPP TS 38.473, are messages (non-UE associated msg.) unrelated to UE 200, when the network side performs propagation delay compensation, it is not possible to report time information acquired by subtracting the propagation delay of the radio section for each UE 200 from DU 120 to CU 110.

(Issue 3): In the F1 interface specified in the 3GPP TS 38.473, there is signaling in which the CU 110 requests the DU 120 for Time Reference Information and the DU 120 reports Time Reference Information (which may be referred to as Reference Time Information) to the CU 110, but it is unknown whether the time information reported from the DU 120 to the CU 110 is

TABLE 1

| User-specific clock synchronicity accuracy level | Number of devices in one Communication group for clock synchronisation | 5G$S synchronicity budget requirement (note) | Service area | Scenario |
|---|---|---|---|---|
| 1 | Up to 300 UEs | ≤900 ns | ≤100 m × 100 m | Motion control Control-to-control communication for industrial controder |
| 2 | Up to 300 UEs | ≤900 ns | ≤1000 m × 100 m | Control to control communication for industrial controller |
| 3 | Up to 10 UEs | <10 μs | ≤2500 m$^2$ | High data rate video streaming |
| 3a | Up to 100 UEs | <1 μs | ≤10 km$^2$ | AVProd synchronisation and packet timing |
| 4 | Up to 100 UEs | <1 μs | <20 km$^2$ | Smart Grid: synchronicity between PMUs |
| 5 | Up to 10 UEs | <50 μs | 400 km | Telesurgery and telediagnosis |

NOTE:
The clock synchronicity requirement refers to the clock synchronicity budget for the 5G system, as described in Clause 5.6.1.

As shown in Table 1, synchronization requirements vary depending on the application scenario, but in use cases such as smart grids (see underlined portion), radio propagation delay compensation between UE 200 and gNB 100 is essential because high synchronization accuracy in a wide service area is required.

Therefore, in the present embodiment, a CU-DU split gNB deployment in which the CU 110 and a plurality of DUs 120 are geographically separated from each other is applied. This can cover a wide service area (up to 20 km$^2$).

(3.2) Issues

In order to satisfy high synchronization accuracy while applying CU-DU split gNB deployment, it is particularly important to compensate for propagation delays in the radio sections of the UE 200 to the DU 120, but an issue arises in how the CU 110 and the plurality of DUs 120 cooperate to appropriately compensate for propagation delays in the radio sections with the plurality of UE 200.

Specifically, there are the following issues.
(Issue 1): When the network (gNB 100) compensates for the radio propagation delay, it is not clear which of the subjected to propagation delay compensation, and double compensation or compensation may not be performed.

(Issue 4): When instructing the propagation delay compensation to the UE 200, it is not clear which of the CU 110 or the DU 120 instructs, and there is a possibility that a double instruction or an instruction is not given.

(3.3) Example of Operation

Hereinafter, an operation example that can solve the above-described issues 1-4 will be described.

(3.3.1) Example 1

This operation example corresponds to the issue 1. That is, it is not clear which CU 110 or DU 120 performs propagation delay compensation, and double compensation or compensation may not be performed.

Specifically, the issue can be solved by any of the operation examples 1-1 to 1-4. In operation example 1-1 to operation example 1-4, either CU 110 or DU 120 reliably performs propagation delay compensation.

(3.3.1.1) Example 1-1

In this operation example, the DU 120 performs propagation delay compensation. FIG. 5 shows the sequence of propagation delay compensation according to the operation example 1-1.

As shown in FIG. 5, the UE 200 transmits a random access preamble (msg.1) toward the DU 120 in order to start a random access procedure (RA procedure) with the gNB 100 (DU 120) (S 10).

When the random access preamble is received, the DU 120 calculates a timing advance (TA) command and at the same time calculates a propagation delay (UE specific propagation delay) specific to the UE 200 (May be read as acquisition hereinafter) (S 20). Note that the calculation of the UE specific propagation delay need not necessarily be performed simultaneously with the calculation of the TA command (value of TA).

The DU 120 transmits a random access response including the TA command to the UE 200 (S 30). The UE 200 and the DU 120 may continue the RA procedure following the random access response.

The DU 120 performs propagation delay compensation based on the calculated UE-specific propagation delay (S 40). Specifically, the DU 120 may calculate the time information acquired by subtracting the UE specific propagation delay and adjust the time information for TSN or the time information for the 5G system (5G GM).

(3.3.1.2) Example 1-2

In this operation example, the DU 120 also performs propagation delay compensation. FIG. 6 shows the sequence of propagation delay compensation according to the operation example 1-2. Hereinafter, the same parts as those of the operation example 1-1 will be appropriately omitted.

As shown in FIG. 6, the UE 200 and the DU 120 may establish a connection (RRC connection) in the RRC layer and maintain a connection state in the RRC layer (S 110). However, as long as the gNB Rx–Tx time difference can be measured, the connection in the RRC layer is not necessarily established.

The DU 120 measures the gNB Rx–Tx time difference (S 120). As described above, the gNB Rx–Tx time difference is defined in Section 3GPP TS 38.215 5.2.3, and may be interpreted as a difference (time difference) between the reception timing and the transmission timing of a specified sub-frame in the DU 120.

Specifically, the gNB Rx–Tx time difference may be defined as $(T_{gNB-Rx} - T_{gNB-TX})$. Here, $T_{gNB-RX}$ is the reception timing of the positioning node (DU 120) of the uplink subframe #i including the Sounding Reference Signal (SRS) associated with the UE 200, and may be defined by the path first detected in time.

$T_{gNB-TX}$ is the transmission timing of the positioning node of the downlink subframe #j that is temporally closest to the subframe #i received from the DU 120.

The DU 120 calculates a propagation delay (UE specific propagation delay) between the UE 200 and the DU 120 based on the calculated gNB Rx–Tx time difference (S 130).

The DU 120 performs propagation delay compensation based on the calculated UE-specific propagation delay (S 140)

(3.3.1.3) Example 1-3

In this operation example, the DU 120 also performs propagation delay compensation. FIG. 7 shows the sequence of propagation delay compensation according to the operation example 1-3.

As shown in FIG. 7, the CU 110 transmits a REFERENCE TIME INFORMATION REPORTING CONTROL, which is a type of F1 message, to the DU 120 (S 210). REFERENCE TIME INFORMATION REPORTING CONTROL includes a Propagation delay compensation request that instructs DU 120 to perform propagation delay compensation.

FIG. 13 shows a configuration example of an information element included in the Reporting Request Type of REFERENCE TIME INFORMATION REPORTING CONTROL. As shown in FIG. 13, the Reporting Request Type may include a Propagation delay compensation request.

The DU 120 calculates a propagation delay (UE specific propagation delay) between the UE 200 and the DU 120 based on the propagation delay compensation request included in the REFERENCE TIME INFORMATION REPORTING CONTROL (S 220).

The DU 120 performs propagation delay compensation based on the calculated UE-specific propagation delay (S 230).

(3.3.1.4) Example 1-4

In this operation example, the CU 110 performs propagation delay compensation. FIG. 8 shows the sequence of propagation delay compensation according to the operation example 1-4.

As shown in FIG. 8, the CU 110 transmits a POSITIONING MEASUREMENT REQUEST to the DU 120 (step 310). The POSITIONING MEASUREMENT REQUEST may be specified in the Positioning Measurement procedure for exchanging the positioning information of a node.

The DU 120 measures the gNB Rx–Tx time difference in response to receipt of the POSITIONING MEASUREMENT REQUEST (S 320).

The DU 120 returns a POSITIONING MEASUREMENT RESPONSE containing the measured gNB Rx–Tx time difference to the CU 110 (S 330).

The CU 110 calculates a propagation delay (UE specific propagation delay) between the UE 200 and the DU 120 based on the gNB Rx–Tx time difference received from the DU 120 (S 340).

The CU 110 performs propagation delay compensation based on the calculated UE specific propagation delay (step 350).

When the DU 120 transmits the REFERENCE TIME INFORMATION REPORT to the CU 110, it may indicate that the propagation delay compensation needed in the CU 110. Alternatively, when the random access preamble (msg.1) is received, the DU 120 may calculate the UE specific propagation delay of the UE 200 at the same time as calculating the TA command and transmit the UE specific propagation delay to the CU 110.

(3.3.2) Example 2

This operation example corresponds to the issue 2. That is, since the REFERENCE TIME INFORMATION REPORTING CONTROL and the REFERENCE TIME INFORMATION REPORT are non-UE associated msg., the DU 120 to the CU 110 cannot report time information acquired by subtracting the propagation delay of the radio section for each UE 200.

In this operation example, in order to solve this issue, REFERENCE TIME INFORMATION REPORTING CONTROL and/or REFERENCE TIME INFORMATION REPORT associated with the RAN UE ID is used.

FIG. 9 shows a sequence of propagation delay compensation according to operation example 2. As shown in FIG. 9, the CU 110 transmits a REFERENCE TIME INFORMATION REPORTING CONTROL (step 410). The REFERENCE TIME INFORMATION REPORTING CONTROL includes the RAN UE ID of the UE 200 subject to propagation delay compensation. As described above, the RAN UE ID is defined in the 3GPP TS 38.473 or the like.

The DU 120 specifies the target UE 200 based on the RAN UE ID included in the REFERENCE TIME INFORMATION REPORTING CONTROL, and calculates time information (For example, time information for TSN) used in the specified UE 200 (S 420). Specifically, the DU 120 calculates time information acquired by subtracting the propagation delay of the radio section with the UE 200.

The DU 120 reports the calculated time information to the CU 110 by a REFERENCE TIME INFORMATION REPORT (S 430). The REFERENCE TIME INFORMATION REPORT includes the RAN UE ID of the UE 200.

FIG. 14 shows an example of the configuration of the information elements included in the REFERENCE TIME INFORMATION REPORT. As shown in FIG. 14, the REFERENCE TIME INFORMATION REPORT may include a RAN UE ID, Time Reference Information Per UE, and Propagation delay compensation needed. Propagation delay compensation needed indicates that the CU 110 needs to compensate for the propagation delay of the UE 200. The REFERENCE TIME INFORMATION REPORTING CONTROL may also include information elements such as RAN UE ID.

The CU 110 performs propagation delay compensation based on the received time information (S 440). Specifically, the CU 110 calculates the UE specific propagation delay of the UE 200 to be compensated for the propagation delay based on the received time information, and performs the propagation delay compensation based on the calculated UE specific propagation delay.

(3.3.3) Example 3

This operation example corresponds to the issue 3. That is, although there is signaling to report Time Reference Information from the DU 120 to the CU 110, it is unknown whether the time information to be reported from the DU 120 to the CU 110 is subjected to propagation delay compensation, and double compensation or compensation may not be performed.

In this operation example, in order to solve the issue, the DU 120 explicitly reports to the CU 110 that it has performed the propagation delay compensation.

FIG. 10 shows a sequence of propagation delay compensation according to operation example 3. As shown in FIG. 10, the CU 110 transmits a REFERENCE TIME INFORMATION REPORTING CONTROL (S 510). The REFERENCE TIME INFORMATION REPORTING CONTROL may include the RAN UE ID of the UE 200 subject to propagation delay compensation, as in the operation example 2.

The DU 120 specifies the target UE 200 based on the RAN UE ID included in the REFERENCE TIME INFORMATION REPORTING CONTROL, and calculates time information (For example, time information for TSN) used in the specified UE 200 (S 520). Specifically, as in the operation example 2, the DU 120 calculates time information acquired by subtracting the propagation delay of the radio section with the UE 200.

The DU 120 performs propagation delay compensation based on the calculated time information (S 530). Specifically, the DU 120 calculates the UE specific propagation delay of the UE 200 to be compensated for the propagation delay based on the calculated time information, and performs the propagation delay compensation based on the calculated UE specific propagation delay.

The DU 120 reports the calculated time information to the CU 110 by a REFERENCE TIME INFORMATION REPORT (S 540). The REFERENCE TIME INFORMATION REPORT may include the RAN UE ID and the Propagation delay compensation completed of the UE 200.

FIG. 15 shows a configuration example of an information element included in Time Reference Information of REFERENCE TIME INFORMATION REPORT. As shown in FIG. 15, the Time Reference Information may include Propagation delay compensation completed. Propagation delay compensation completed indicates that the DU 120 has already performed propagation delay compensation for the UE 200

(3.3.4) Example 4

This operation example corresponds to the issue 4. That is, when the network, specifically, the gNB 100 instructs the UE 200 to compensate for the propagation delay, it is not clear which of the CU 110 or the DU 120 instructs, and there is a possibility that a double instruction or an instruction is not given.

In this operation example, in order to solve this issue, a mechanism is introduced in which the CU 110 or the DU 120 can always instruct the UE 200 to compensate for the propagation delay, and specifically, can instruct the UE 200 to require or complete the propagation delay compensation.

FIG. 11 shows a sequence (unit 1) of propagation delay compensation according to operation example 4. As shown in FIG. 11, the CU 110 determines a compensation method for the propagation delay in the radio section between the UE 200 and the gNB 100 (DU 120) (step 610). Specifically, CU 110 determines to perform propagation delay compensation at UE 200.

The CU 110 determines a propagation delay compensation instruction to the UE 200 based on the determined propagation delay compensation method (S 620).

The CU 110 transmits system information or a message including a propagation delay compensation instruction to the UE 200 to the UE 200 via the DU 120 (step 630). Specifically, the CU 110 transmits system information (SIB 9) including referenceTimeInfo-r16 and Propagation delay compensation need or DLInformationTransfer msg. including referenceTimeInfo-r16 and Propagation delay compensation need to the UE 200.

FIG. 12 shows a sequence (unit 2) of propagation delay compensation according to operation example 4. In FIG. 11, the CU 110 determines the method of compensating for the propagation delay, but in the sequence of FIG. 12, the DU 120 determines the method of compensating for the propagation delay.

As shown in FIG. 12, the CU 110 transmits system information (SIB 9) (S 710). SIB 9 includes referenceTimeInfo-r16 but not Propagation delay compensation needed.

The DU 120 determines a compensation method for the propagation delay in the radio section between the UE 200 and the gNB 100 (DU 120) (S 720). Specifically, DU 120 determines to perform propagation delay compensation at UE 200.

The DU 120 determines a propagation delay compensation instruction to the UE 200 based on the determined propagation delay compensation method (S 730).

The DU 120 transmits system information (SIB 9) including an instruction of propagation delay compensation to the UE 200 to the UE 200 (S 740). The SIB 9 or DLInformationTransfer msg includes a Propagation delay compensation need.

As shown in FIGS. 11 and 12, when the referenceTimeInfo-r16 is included in the SIB 9, either the CU 110 or the DU 120 may include (encode) in the SIB 9 a propagation delay compensation need for the UE 200. If the CU 110 does not encode the propagation delay compensation instruction into the SIB 9, it may be interpreted as implicitly instructing the DU 120 to encode the propagation delay compensation instruction into the SIB 9.

When the referenceTimeInfo-r16 is included in the DLInformationTransfer msg., the CU 110 may instruct the propagation delay compensation in the DLInformationTransfer msg.

When the CU 110 or the DU 120 performs propagation delay compensation as in the operation example 1~3, the SIB 9 or the DLInformationTransfer msg. may include Propagation delay compensation completed.

FIG. 16 shows a configuration example of DLInformationTransfer msg. As shown in FIG. 16, the DLInformationTransfer msg. may include a field of Propagation delay compensation needed. Propagation delay compensation needed may indicate whether the network requires UE 200 to perform propagation delay compensation. True may indicate that the network requires the UE to perform propagation delay compensation.

FIG. 17 shows a configuration example of the SIB 9. As shown in FIG. 17, the SIB 9 may also include a field of Propagation delay compensation needed.

(4) Operational Effects

According to the embodiment described above, the following effects are acquired. More specifically, the gNB 100 (CU 110 or DU 120) can reliably perform the compensation of the propagation delay in the radio section between the UE 200 and the gNB 100 or the instruction of the propagation delay compensation even when radio communication system 10 handles the time information for TSN.

Therefore, even when the CU-DU split gNB deployment is applied in an application scenario requiring high synchronization accuracy, such as IIoT (including smart grid), the roles and operations of the CU 110 and the DU 120 become clear, and the CU 110 and the DU 120 can appropriately cooperate to perform propagation delay compensation between the UE 200 and the gNB 100.

More specifically, the gNB 100 may acquire and perform propagation delay compensation with the UE 200 in response to receipt of a specified message or response (Random access preamble (msg.1), POSITIONING MEASUREMENT RESPONSE, and so on), and the propagation delay compensation may be performed at the CU 110 or DU 120. Therefore, the possibility of double compensation or non-compensation can be surely eliminated.

In the present embodiment, the gNB 100 (DU 120) can acquire the propagation delay with the UE 200 based on the time difference (gNB Rx–Tx time difference) between the reception and transmission of the radio signal and perform propagation delay compensation. Therefore, the possibility of double compensation or non-compensation can be surely eliminated.

In this embodiment, the gNB 100 (DU 120) can transmit time information adjusted based on the propagation delay between the identification information (RAN UE ID) of the UE 200 and the associated UE 200. Therefore, the time information acquired by subtracting the propagation delay of the radio section can be reported from the DU 120 to the CU 110 for each UE 200.

In the present embodiment, the gNB 100 (DU 120) can transmit a response message (REFERENCE TIME INFORMATION REPORT) containing compensation information (Propagation delay compensation completed) indicating whether or not the propagation delay compensation with the UE 200 associated with the identification information (RAN UE ID) of the UE 200 has been performed. Therefore, it is possible to clarify whether or not the time information reported from the DU 120 to the CU 110 is subjected to propagation delay compensation, and the possibility of double compensation or non-compensation can be surely eliminated.

In this embodiment, the gNB 100 (CU 110 or DU 120) can include in the system information (SIB 9) or a message related to the downlink (DLInformationTransfer msg.) whether it is necessary to instruct the UE 200 to compensate for the propagation delay with the UE 200. Therefore, even when the UE 200 is instructed to compensate for the propagation delay, it is possible to clarify which of the CU 110 or the DU 120 is instructed, and the possibility that a double instruction or an instruction is not instructed can be surely eliminated.

(5) Other Embodiments

Although the embodiment has been described above, it is obvious to those skilled in the art that various modifications and improvements are possible without being limited to the description of the embodiment.

For example, the embodiment described above assumes the application of the CU-DU split gNB deployment, but the CU-DU split gNB deployment is not necessarily required. That is, the CU 110 and the DU 120 may be located relatively close to each other geographically.

Further, although the above-described embodiment assumes that radio communication system 10 is connected to the TSN, it does not have to be a network or application scenario in which high synchronization accuracy such as the TSN is required.

The block configuration diagrams (FIGS. 3 and 4) used in the description of the above-described embodiment show blocks in units of functions. Those functional blocks (structural components) can be realized by a desired combination of at least one of hardware and software. Means for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions the transmission is called a transmission unit (transmitting unit) or a transmitter. As described above, there is no particular limitation on the method of implementation.

Figure 18:
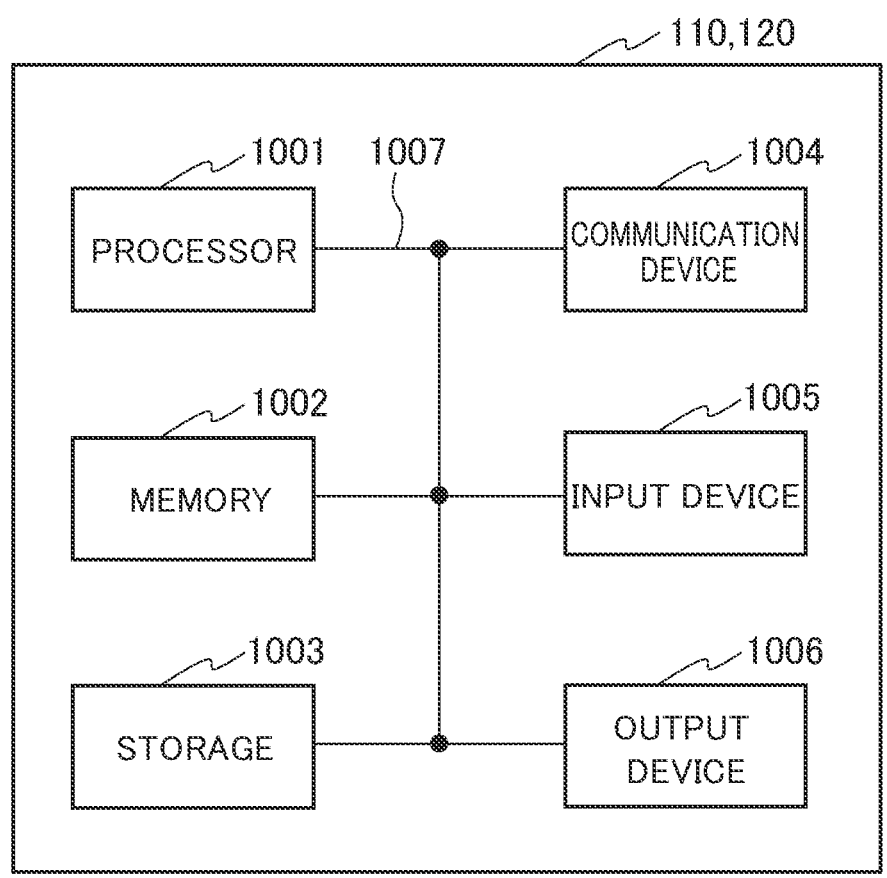
FIG. 18 is a diagram showing an example of the hardware configuration of the CU 110 and the DU 120.

Further, the above-described gNB 100 (CU 110 and DU 120) may function as a computer that performs processing of the radio communication method of the present disclosure. FIG. 18 is a diagram showing an example of the hardware configuration of the CU 110 and the DU 120. As shown in FIG. 18, the CU 110 and DU 120 may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices shown in the figure, or can be constituted by without including a part of the devices.

The functional blocks of the CU 110 and the DU 120 (see FIGS. 3 and 4) are implemented by any hardware element of the computer device or a combination of the hardware elements.

Each of the functions of the CU 110 and the DU 120 is realized by reading predetermined software (program) onto hardware such as the processor 1001 and the memory 1002 so that the processor 1001 performs arithmetic operations to control communication by communication device 1004 and to control at least one of reading and writing of data in the memory 1002 and the storage 1003.

The processor 1001 operates, for example, an operating system to control the entire computer. Processor 1001 may comprise a central processing unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Alternatively, various processes explained above can be executed by one processor 1001 or can be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, or the like. The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Devices such as the processor 1001 and the memory 1002 are connected by a bus 1007 for communicating information. The bus 1007 may be configured using a single bus or may be configured using different buses for each device.

In addition, the device may comprise hardware such as a microprocessor, a digital signal processor (DSP), an application specific integrated circuit (ASIC), a programmable logic device (PLD), a field programmable gate array (FPGA), and the hardware may implement some or all of each functional block. For example, the processor 1001 may be implemented by using at least one of these hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI), higher layer signaling (e.g., RRC signaling, Medium Access Control (MAC) signaling, broadcast information (Master Information Block (MIB), System Information Block (SIB)), other signals, or a combination thereof. The RRC signaling may also be referred to as an RRC message, for example, an RRC Connection Setup message, an RRC Connection Reconfiguration message, and the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each aspect/embodiment described in the present disclosure may be changed in order as long as there is no contradiction. For example, the methods described in this disclosure use an exemplary sequence to present the elements of the various steps and are not limited to the particular sequence presented.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information, signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each of the aspects/embodiments described in the present disclosure may be used alone, in combination, or switched over in accordance with implementation. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of the channel and the symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, planes, etc.), an unmanned mobile body (Drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal). For example, each aspect/ embodiment of the present disclosure may be applied to a configuration in which communication between a base station and a mobile station is replaced with communication between a plurality of mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side".). For example, terms an uplink channel, a downlink channel, or the like may be read as a side channel.

Similarly, the mobile station in the present disclosure may be read as a base station. In this case, the base station may have the function of the mobile station. A radio frame may be composed of one or more frames in the time domain. Each frame or frames in the time domain may be referred to as a subframe. A subframe may be further configured by one or more slots in the time domain. The subframe may be a fixed time length (For example, 1 ms) independent of the numerology.

Numerology may be a communication parameter applied to at least one of transmission and reception of a certain signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may be configured with one or a plurality of symbols (Orthogonal Frequency Division Multiplexing (OFDM)) symbols, Single Carrier Frequency Division Multiple Access (SC-FDMA) symbols, etc.) in the time domain. A slot may be a unit of time based on the numerology.

A slot may include a plurality of minislots. Each minislot may be configured with one or more symbols in the time domain. A minislot may also be called a subslot. A minislot may be composed of fewer symbols than slots. PDSCH (or PUSCH) transmitted in time units greater than the minislot may be referred to as PDSCH (or PUSCH) mapping type A. PDSCH (or PUSCH) transmitted using a minislot may be referred to as PDSCH (or PUSCH) mapping type B.

Each of the radio frame, subframe, slot, minislot, and symbol represents a time unit for transmitting a signal. Different names may be used for the radio frame, subframe, slot, minislot, and symbol.

For example, one subframe may be called a transmission time interval (TTI), a plurality of consecutive subframes may be called TTI, and one slot or one minislot may be called TTI. That is, at least one of the sub-frame and TTI may be a sub-frame (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (that is, one or more slots or one or more minislots) may be the minimum scheduling unit. The number of slots (minislot number) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. TTI shorter than the ordinary TTI may be referred to as a shortened TTI, a short TTI, a partial TTI (partial or fractional TTI), a shortened subframe, a short subframe, a minislot, a subslot, a slot, and the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and frequency domain, and may include one or a plurality of continuous subcarriers in the frequency domain. The number of subcarriers included in RB may be, for example, twelve, and the same regardless of the topology. The number of subcarriers included in the RB may be determined based on the neurology.

Also, the time domain of RB may include one or a plurality of symbols, and may have a length of 1 slot, 1 minislot, 1 subframe, or 1 TTI. Each TTI, subframe, etc. may be composed of one or more resource blocks.

Note that, one or more RBs may be called a physical resource block (Physical RB: PRB), a subcarrier group (Sub-Carrier Group: SCG), a resource element group (Resource Element Group: REG), PRB pair, RB pair, etc.

A resource block may be configured by one or a plurality of resource elements (Resource Element: RE). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB based on the common reference point of the carrier. PRB may be defined in BWP and numbered within that BWP.

BWP may include UL BWP (UL BWP) and DL BWP (DL BWP). One or a plurality of BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes included in a radio frame, the number of slots per subframe or radio frame, the number of minislots included in a slot, the number of symbols and RBs included in a slot or minislot, the subcarriers included in RBs, and the number of symbols included in TTI, a symbol length, the cyclic prefix (CP) length, and the like can be changed in various manner.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or "decision" may include regarding some action as "judgment" or "decision". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS 10 radio communication system
20 NG-RAN
25 TSC GM
30 5GC
35 UPF
40 IoT Devices
100 gNB
110 CU
111 network connection unit
113 DU connection unit
115 delay compensation control unit
117 message transmission/reception unit
119 system Information transmission unit
120 DU
121 radio transmission unit
123 radio reception unit
124 CU Connection unit
125 delay compensation control unit
126 RA processing Unit
127 time information processing unit
128 message transmission/reception unit
200 UE
1001 processor
1002 memory
1003 storage
1004 communication device
1005 input device
1006 output device
1007 bus

The invention claimed is:

1. A radio base station comprising:
a first communication node; and
at least one or more second communication nodes; wherein
the first communication node transmits a request including identification information of a terminal to the second communication node;
the second communication node returns a response including a time difference between reception and transmission of a wireless signal to the first communication node in response to the request; and
a propagation delay compensation is executed based on the response,
wherein the response further includes the identification information that uniquely identifies each terminal.

2. The radio base station according to claim 1, wherein the propagation delay compensation is executed in the first communication node.

3. The radio base station according to claim 1, wherein the radio base station transmits a message including an instruction of the propagation delay compensation to the terminal.

4. The radio base station of claim 1, wherein the radio base station transmits a message including time information related to propagation delay to the terminal.

5. A radio communication method by a radio base station including a first communication node and at least one or more second communication nodes, comprising:
transmitting, by the first communication node, a request including identification information of a terminal to the second communication node;
returning, by the second communication node, a response including a time difference between reception and transmission of a radio signal to the first communication node in response to the request; and performing propagation delay compensation based on the response, wherein the response further includes the identification information that uniquely identifies each terminal.

* * * * *